June 26, 1928.
T. B. FERGUSON
OIL BURNER
Filed June 29, 1925
1,674,719
3 Sheets-Sheet 1
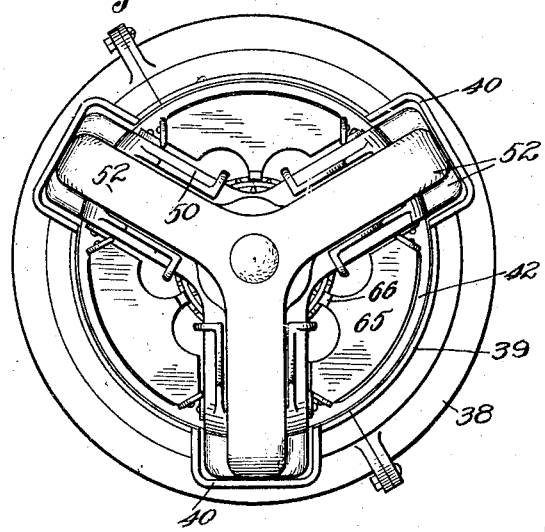
Fig. 1.
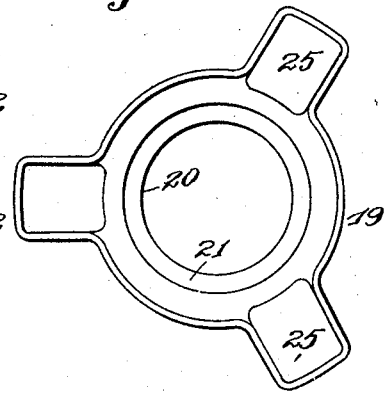
Fig. 3.
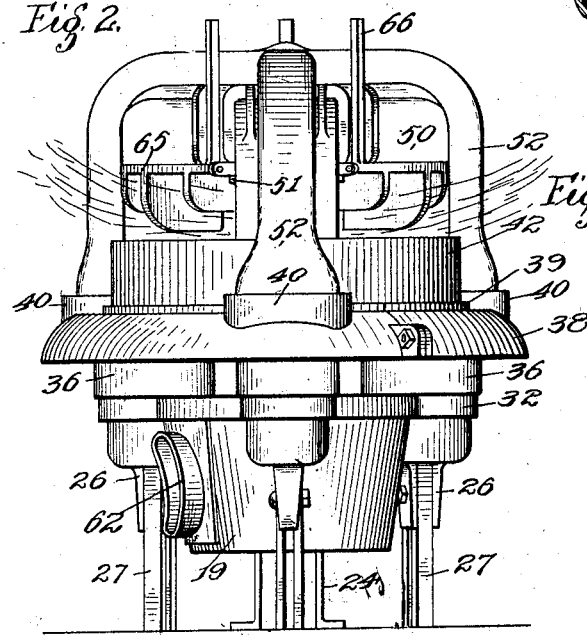
Fig. 2.
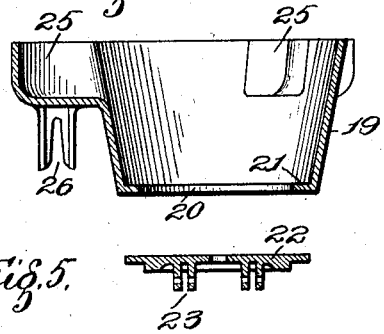
Fig. 4.
Fig. 5.
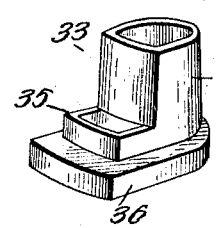
Fig. 6.
Inventor.
Thomas B Ferguson

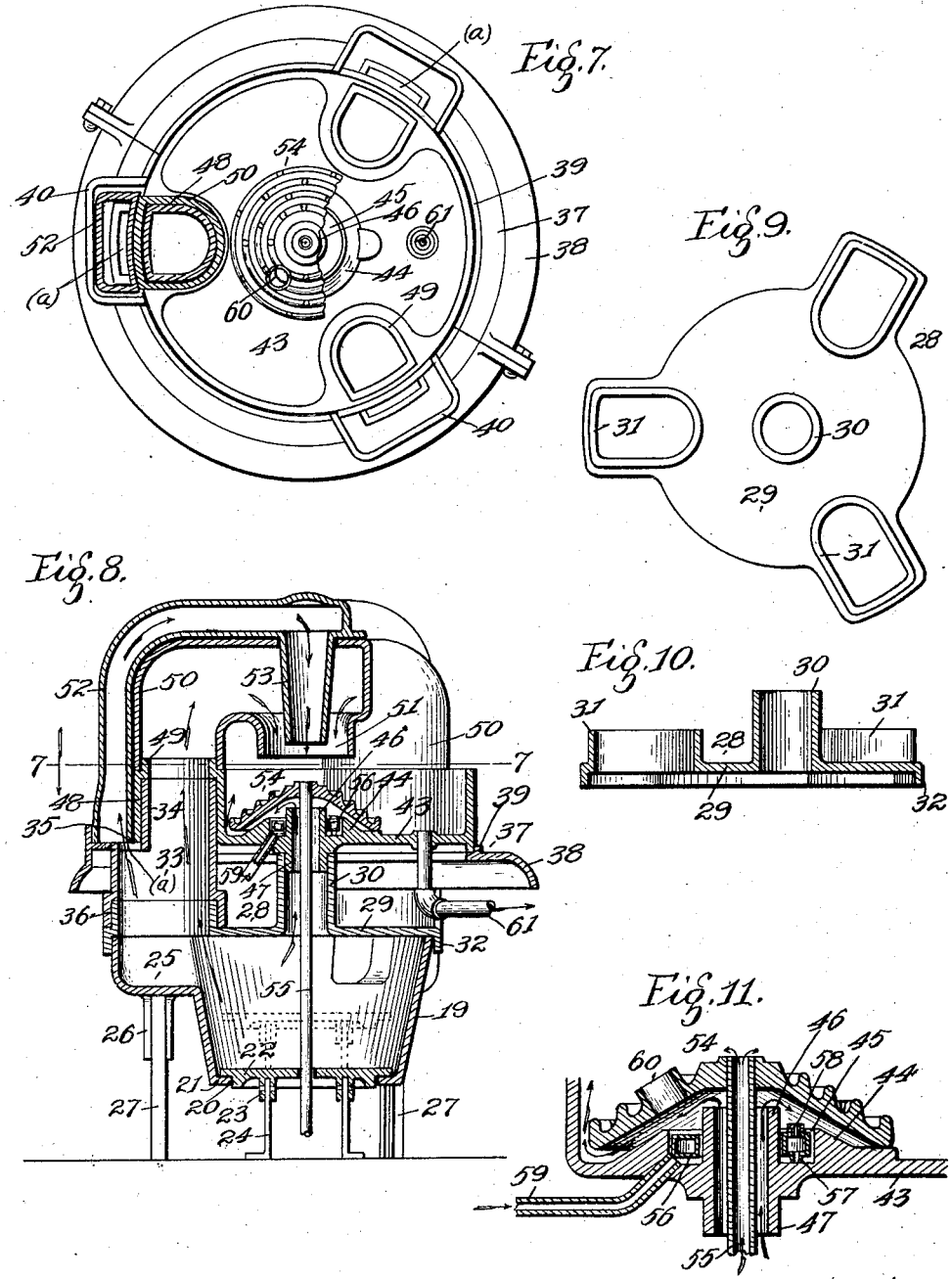

June 26, 1928.   1,674,719
T. B. FERGUSON
OIL BURNER
Filed June 29, 1925   3 Sheets-Sheet 3
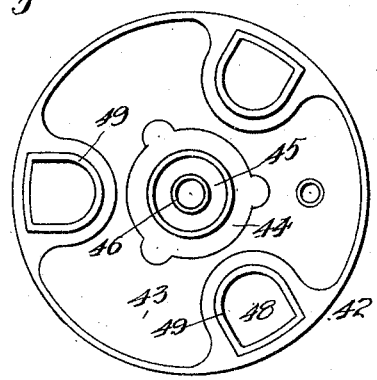
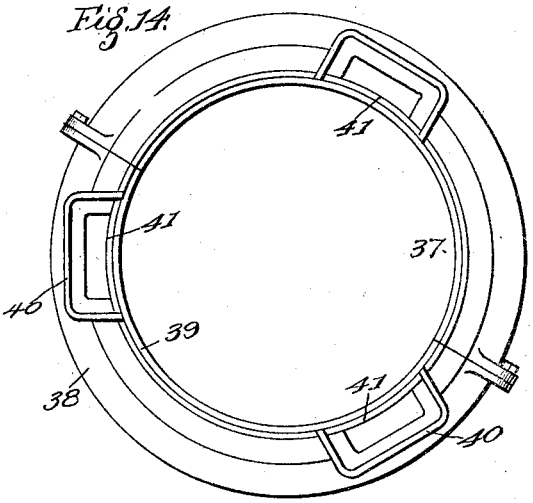
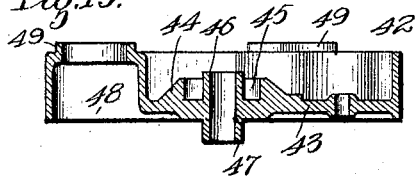
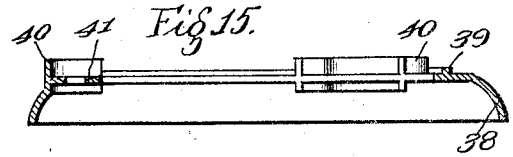
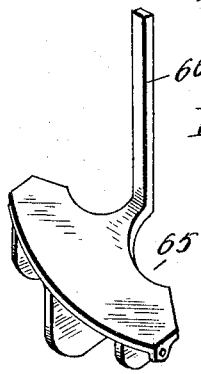
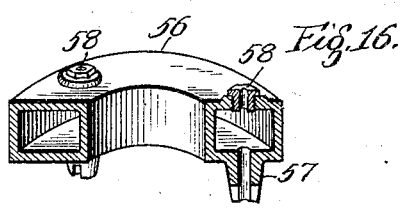
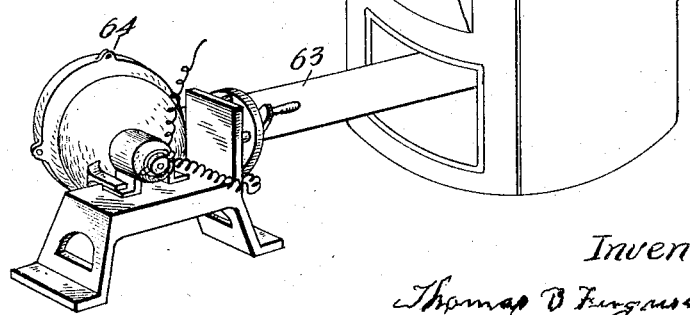
Inventor
Thomas B Ferguson Patented June 26, 1928.

1,674,719

UNITED STATES PATENT OFFICE.

THOMAS B. FERGUSON, OF ST. LOUIS, MISSOURI.

OIL BURNER.

Application filed June 29, 1925. Serial No. 40,245.

This invention relates to improvements in oil burners especially adaptable for use in heating furnaces of any style or type. It is so constructed and built up of co-relating parts as to create a flame utilizing all particles of combustion, consequently keeping the interior of the fire chamber of the furnace and flues free from carbon.

The burner when installed in the furnace is easy to control, and when once properly adjusted and regulated, the carbonaceous material will be completely oxidized in the combustion zone, thus every particle will be consumed, delivering an excessive heat by a comparatively smokeless flame.

The several parts comprising the burner are so built up, positioned and arranged as to form a plurality of air ports or passages, some of the air being pre-heated before contacting with the atomized oil spray, some of the air admitted, passing in under ordinary atmosphere temperature, some of the air is admitted above the burner and some underneath it, so by this arrangement the proper amount of air mixture is provided to intermingle with the vapor, thereby constituting perfect combustion.

In conjunction with the burner proper, I provide a pilot light arrangement which is fed and supplied with oil on the principle of a student lamp; it will not overflow, but constantly keep the spreader head heated so that in order to start the burner, it will automatically blaze up when oil is admitted to the head, without the use of applying a swab or kindler. As the burner becomes ignited and burning, the pilot light is shut off.

My burner has many advantageous features; each one will be hereinafter fully described and referred to in detail.

Figure 1 is a top plan view of my complete burner.

Figure 2 is a front elevation of the same.

Figure 3 is a detail top plan view of the air drum or base bowl made use of.

Figure 4 is a central vertical sectional view of the same.

Figure 5 is a detail central sectional view of the bowl aperture cover made use of.

Figure 6 is a detail perspective view of one of the port thimbles used in the burner construction.

Figure 7 is a horizontal sectional view of the burner taken on the line 7—7 of Figure 8.

Figure 8 is a central vertical sectional view of the complete burner.

Figure 9 is a detail top plan view of the air drum top.

Figure 10 is a central vertical sectional view of the same.

Figure 11 is an enlarged detail sectional view of the spreader head and a portion of the burner pan showing their relative position.

Figure 12 is a detail top plan view of the burner pan.

Figure 13 is a central sectional view of the same.

Figure 14 is a detail top plan view of the outer supporting ring made use of.

Figure 15 is a central sectional view of the same.

Figure 16 is a detail sectional perspective view of the pilot light vaporizer positioned beneath the spreader head.

Figure 17 is a detail perspective view of one of the flame regulating wings made use of.

Figure 18 is a perspective view of a portion of a furnace in which the burner is installed, showing a forced air connection, and automatic regulator mechanism.

Refering to the construction of the burner in detail, I will now describe the several parts and the manner in which each part is positioned and its purpose and function.

The burner comprises an air drum or base bowl 19, arranged somewhat tapered in form, its bottom provided with an aperture or opening 20, which acts as an air inlet under ordinary atmospheric pressure. On the flange 21 surrounding the aperture, I place a cover or drum bottom 22, equipped with ears 23, between which are supported legs or supports 24, and by means of these legs the cover or bottom may be elevated in the bowl as shown by dotted lines at any desired position, and held in such position by placing a block under the feet of the legs. This adjustment of the cover or bottom controls the air passage and the air admission into the bowl from underneath, which is admitted under ordinary atmospheric pressure and when no force feed is used.

The upper portion of the bowl is equipped with pockets 25, through which air is directed to the component parts, and on the bottom of each pocket are provided arms 26, by which are supported standards 27 for supporting the entire burner in the furnace.

On top of the bowl 19 is placed an air drum top 28, consisting of a plate 29 having a central sleeve 30, extension flanges 31, and a rim flange 32, the extension flanges 31 acting as continuations to the air ports formed in the head.

Over these extension flanges 31, is placed port thimbles 33, consisting of an extended body portion 34, and extension 35 arranged to one side, and a flanged base 36 which fits over the top of the extension flanges 31 of the drum top. The extension 35 of the thimbles is provided with an opening forming an air port.

On the top of these extensions 35, I place an outer supporting ring 37, consisting of a curved outer rim 38, with a vertically extending flange 39, and port formation flanges 40, which register with the extension flanges 31, and the extensions 35 of the thimbles. This ring is supported in position by the webs 41 which rest upon the top of the extension 35 of the thimbles.

I next place on top of the ring a burner pan 42, comprising a horizontal disc portion 43, with a central extended tapered portion 44, in which is arranged a cavity or pocket 45, and a central sleeve 46, the lower portion 47 fitting into the sleeve 30 of the bowl cover. The disc portion 43 also terminates into sockets 48 which fit over and on top of the body portion 34 of the thimbles.

On top of the flanged end 49 of the sockets I place the inner or pre-heating manifold 50, which is arranged to correspond with the flanges of the pan, and each arm of the manifold diverges into a central discharge opening 51 of sufficient diameter to direct the air directly over the spreader head mounted in the pan immediately beneath the opening.

On the outside or over the inner manifold 50, I place an outer or surface heated manifold 52, the bottom ends of the arms fitting into the flanges 40, and resting on the top of the extensions 35 of the thimbles. This arrangement provides an air inlet to each of the arms of the outer maifold, (a) admitting air from the interior and directed toward the center, discharging it through a nozzle 53 extending downwardly through the central passage 51, above the spreader head.

Above the conical projection of the burner pan, I place a spreader head 54 arranged preferably conical in form. It is provided with a central opening in which an oil feed or fuel supply pipe 55 is secured. The upper or top surface of the spreader head is grooved as shown providing oil repositories and each ridge of the grooves are notched to permit the oil to flow from one to the other, but when once the plate is properly heated, the oil is immediately converted to a gaseous vapor and ignites readily.

In the cavity or pocket 45, I place a vaporizer 56 consisting of a hollow ring having a plurality of hollow standards 57, and the top is provided with jets 58 through which the vapor is ejected. In the cavity around the vaporizer is placed a quantity of noncombustible absorbent material which is saturated with oil and a certain amount passes up through the hollow standards into the hollow ring, becoming vaporized, and the fuel is fed to the cavity by the pilot supply pipe 59, fed from a conveniently located auxiliary supply tank which operates automatically to prevent the cavity from overflowing.

The pilot light mechanism is originally ignited or lighted through the opening 60 formed in the spreader head, and through which access may be had to the pilot vaporizer.

In the event the burner should become extinguished, any overflow of fuel will be drained from the pan by means of the overflow pipe 61.

By the assembly of the several parts comprising the burner, a plurality of air ports or passages are formed. Air is admitted upwardly through the center sleeve 30, under the spreader head and passing out around its lower edge as shown by the arrows in Figures 8 and 11. Air is admitted from the bowl through the ports passing up into the arms of the inner manifold and directed above the spreader head as shown by the arrows in Figure 8. An air current is admitted to the arms of the outer manifold through the ports (a) and directed downwardly through the nozzle 53, and discharged above the spreader head, the air passing through this outer member is excessively heated, while the air in the inner manifold is heated to a less degree, thereby making a combustible mixture of excessive and partially heated air, directed against the gaseous vapor which instantly oxidizes all particles of carbon, thus making the flame absolutely smokeless.

The bowl is provided on its one side with an air inlet opening 62, to which is connected a pipe 63, attached to a power driven fan or blower 64, which is thermostatically controlled. By this means the air is delivered to the interior of the burner under a forced pressure.

However, the burner can be operated without the fan or blower attachment, but in such instance the aperture cover 22 must be elevated in the bowl, as shown by dotted lines in Figure 8, allowing the air to enter from the bottom under ordinary atmospheric pressure.

In order to regulate the spread of the flame in the burner I provide between each arm of the manifold a hinged wing 65 elevated a convenient distance above the burner pan, and these wings are equipped with arms 66 extending a short distance above the burner top so that they may be tilted to a proper angle by the agency of a poker or the like. Thus when the wings are tilted it confines the blaze more to the interior of the head, and when flat the flame assumes a more flattened or saucerlike shape.

As soon as the burner is extinguished, the pilot mechanism is placed in action. By this means the spreader head is kept continuously heated by a small flame beneath, and as soon as oil is admitted through the fuel supply pipe 55, and reaches the heated spreaded head, it instantly ignites, then the pilot light is extinguished while the burner is in action.

Having fully described my invention, what I claim is:

1. An oil burner comprising an air drum, a perforated cover placed thereon, hollow thimbles mounted on the cover over the perforations, a deflector ring supported on the thimbles, a burner pan supported by said thimbles, an inner manifold mounted on the burner pan, and outer manifold positioned on top of the inner manifold, its bottom air intake ends resting on the thimbles, a spreader plate located centrally in the burner pan, and a pilot light below the spreader.

2. A burner comprising a plurality of detachable members forming a head, a ribbed surface spreader head mounted therein and an inner and an outer manifold forming the top of the burner head, in which are air passages converging to a centrally located air discharge opening positioned above the spreader head for directing a mixture of pre-heated air against the ignited fuel on the spreader head, a pilot light located beneath the spreader head, and an oil supply pipe feeding to the spreader head.

3. A burner comprising a burner pan, a grooved extension formed in its center, a conical shaped spreader head located above the same and forming an air passage between the spreader and pan, a hollow ring provided with jets located in the grooved extension acting as a pilot light for keeping the spreader head steadily heated, a feed pipe leading to the grooved extension for supplying fuel to the pilot light, and a fuel supply pipe leading to the spreader head.

4. A burner of the class described comprising a base member into which air is directed, a burner pan located above the base member, an inner and an outer manifold located above the pan, both manifolds having central discharge openings, a spreader plate within the burner pan on which the fuel is fed, a pilot light positioned below the spreader plate.

5. A burner of the character described comprising a hollow base member having an air inlet port through which air is admitted into said member, a burner pan placed on top of said base member, a grooved projection formed in the center of the burner pan, a pilot light ring seated in the groove formed in the projection, a fuel supply pipe extending through the center of the projection, a spreader plate attached to the top of the fuel supply pipe and spaced above the burner pan and central projection, and an inner and an outer manifold located above the burner pan, said manifolds having centrally downwardly projecting nozzles through which air is directed downwardly above the spreader plate, substantially as specified.

6. A burner of the character described comprising a plurality of members set together and consisting of an air drum as the base, a drum top mounted thereon, a supporting ring supported thereby, a burner pan located therein, thimbles positioned on the pan, and an inner and an outer manifold supported on the thimbles, said parts forming air ports for directing air from the bottom member and discharging it centrally above the burner pan, a spreader located in the pan and on which the fuel is distributed and ignited forming a flame, air passages below the spreader through which air is directed beneath the flame on the spreader, the inner and outer manifolds having central air discharge openings for directing heated air above the flame and located above the burner pan, and deflector wings located above the burner pan for controlling the spread of the flame.

7. A burner comprising a hollow base, a perforated base cover above the same, thimbles supported by the cover, a burner pan above the cover, a pilot light arrangement carried by the burner pan, an inner manifold having a central discharge opening mounted on the thimbles, an outer manifold having a central air discharge nozzle located on top of the inner manifold, all of said members containing communicating air ports for directing air from the base and discharging above the burner pan, central ports for directing air into the pan from underneath, and a spreader head located in the burner pan and on which the fuel is distributed.

8. A burner comprising a plurality of detachable sections connected together forming a head, the bottom section being an air drum into which air is admitted, an adjustable bottom in the drum for regulating the admission of air under atmospheric pressure, the upper portion of the head being formed by an inner manifold mounted on the bottom section and having a plurality of hollow arms converging to a central discharge opening, an outer manifold mounted over the inner manifold also having a plurality of hollow arms converging to a central nozzle which extends through the center opening of the inner manifold, a burner pan below the manifold, a spreader head located on the burner pan to which the fuel is distributed, and flame spreading wings positioned above the burner pan between the arms of the manifold.

In witness whereof I hereunto set my hand.

THOMAS B. FERGUSON.